(12) United States Patent
Ahn et al.

(10) Patent No.: US 9,470,548 B2
(45) Date of Patent: Oct. 18, 2016

(54) DEVICE, SYSTEM AND METHOD FOR CALIBRATION OF CAMERA AND LASER SENSOR

(71) Applicants: Seong Yong Ahn, Geoje-si (KR); Tok Son Choe, Daejeon (KR); Yong Woon Park, Daejeon (KR); Won Seok Lee, Daejeon (KR)

(72) Inventors: Seong Yong Ahn, Geoje-si (KR); Tok Son Choe, Daejeon (KR); Yong Woon Park, Daejeon (KR); Won Seok Lee, Daejeon (KR)

(73) Assignee: AGENCY FOR DEFENSE DEVELOPMENT, Yuseng-Gu, Daejeon (KR)

( * ) Notice: Subject to any disclaimer, the term of this patent is extended or adjusted under 35 U.S.C. 154(b) by 343 days.

(21) Appl. No.: 13/949,622

(22) Filed: Jul. 24, 2013

(65) Prior Publication Data

US 2013/0305805 A1    Nov. 21, 2013

Related U.S. Application Data

(63) Continuation of application No. PCT/KR2011/001523, filed on Mar. 4, 2011.

(30) Foreign Application Priority Data

Jan. 31, 2011  (KR) .................. 10-2011-0009778

(51) Int. Cl.
*G01C 23/00* (2006.01)
*G01S 7/497* (2006.01)
*G01S 17/08* (2006.01)
*G01S 17/87* (2006.01)

(52) U.S. Cl.
CPC ............... *G01C 23/00* (2013.01); *G01S 7/497* (2013.01); *G01S 17/08* (2013.01); *G01S 17/87* (2013.01)

(58) Field of Classification Search
CPC .................................................... G01C 23/00
USPC .............. 73/1.79, 1.81; 702/94, 95, 150–153
See application file for complete search history.

(56) References Cited

U.S. PATENT DOCUMENTS

| 6,101,455 A * | 8/2000 | Davis ..................... B25J 9/1697 382/153 |
| 6,392,744 B1 * | 5/2002 | Holec ..................... G01S 17/46 356/3.01 |

(Continued)

FOREIGN PATENT DOCUMENTS

EP            1 524 494 A1      4/2005

OTHER PUBLICATIONS

International Search Report dated Feb. 24, 2012 issued in PCT/KR2011/001523.

*Primary Examiner* — Hezron E Williams
*Assistant Examiner* — Hoang Nguyen
(74) *Attorney, Agent, or Firm* — Scully, Scott, Murphy & Presser, P.C.

(57) ABSTRACT

Disclosed are a calibration device, a calibration system and a calibration method. The calibration device includes a camera configured to capture image information, a laser sensor configured to capture image information, a laser sensor configured to detect distance information, and a calibration module configured to perform a calibration of the camera and the laser sensor by obtaining a relation between the image information and the distance information, wherein the calibration module includes a plane member disposed to intersect a scanning surface of the laser sensor such that an intersection line is generated, and disposed within a capturing range by the camera so as to be captured by the camera, and a controller configured to perform coordinate conversions with respect to the image information and the distance information based on a ratio between one side of the plane member and the intersection line, and based on a plane member image included in the image information. Under these configurations, a calibration is performed through direct coordinate conversions with respect to image information and distance information.

16 Claims, 6 Drawing Sheets

(56) References Cited

U.S. PATENT DOCUMENTS

2002/0075471 A1 6/2002 Holec
2006/0268285 A1* 11/2006 Karabassi .......... G01B 11/2504
   356/601
2007/0183631 A1* 8/2007 Zhang ..................... B64C 33/02
   382/110
2009/0086199 A1* 4/2009 Troy ........................ G01C 1/04
   356/251

* cited by examiner

DEVICE, SYSTEM AND METHOD FOR CALIBRATION OF CAMERA AND LASER SENSOR

TECHNICAL FIELD

The present disclosure relates to a camera, a system and a method for calibration of a camera, and a laser sensor (laser range finder), and more particularly, to a calibration device for performing coordinate conversions with respect to a camera and a laser sensor, a calibration system, and a calibration method.

BACKGROUND ART

Nowadays, a laser sensor (or laser distance sensor) having information on angles and distances is being widely used as fields of robots, autonomous mobile vehicles, etc. are extended. In an industrial field or a military field, a camera image is being much used together with the laser sensor in order to utilize more information. However, in order to use the camera together with the laser sensor, a calibration for obtaining a relation between the laser sensor and the camera has to be performed.

As the conventional calibration method, has been mainly used a method for obtaining a relation between a camera image and a laser distance sensor by converting laser points of the laser distance sensor into laser points of a camera, and then by converting the corresponding points of the camera into laser points of a camera image (refer to FIG. 10). In order to estimate positions of the laser points of the camera image, a visible laser distance sensor has been used, or a camera image with respect to a checkboard and restriction conditions on positions of the camera and the laser distance sensor have been used. Alternatively, geometric characteristics of a checkboard have been used.

However, these methods may have the following problems. More concretely, in order to convert laser points into a camera image, an intrinsic parameter has to be firstly calculated. Then, an extrinsic parameter has to be calculated. Here, the extrinsic parameter indicates a rotation and a translation between a camera coordinates system and an image captured by a camera. Furthermore, the conversion matrix with respect to a coordinate system of the camera and a coordinate system of the laser sensor has to be calculated again. This may cause a calculation time and a complicated degree to be increased.

DISCLOSURE OF INVENTION

Technical Problem

Therefore, it is an object of the present disclosure to provide a calibration device capable of more rapidly performing a calibration of a camera and a laser sensor in a different manner from the conventional method, a calibration system and a calibration method.

It is another object of the present disclosure to provide a calibration device for calculating a conversion matrix between a camera and a laser sensor, a calibration system and a calibration method.

Solution to Problem

To achieve these and other advantages and in accordance with the purpose of the present disclosure, as embodied and broadly described herein, there is provided a calibration device comprising a camera configured to capture image information, a laser sensor configured to detect distance information, and a calibration module configured to perform a calibration of the camera and the laser sensor by obtaining a relation between the image information and the distance information, wherein the calibration module includes a plane member disposed to intersect a scanning surface of the laser sensor such that an intersection line is generated, and disposed within a capturing range by the camera so as to be captured by the camera, and a controller configured to perform coordinate conversions with respect to the image information and the distance information based on a ratio between one side of the plane member and the intersection line, and based on a plane member image included in the image information.

The one side of the plane member may be disposed to be parallel to the scanning surface. The plane member may be formed in a triangle or a trapezoid having the one side as a bottom side.

The controller may calculate second position data of an intersection line image corresponding to the intersection line, from the plane member image by using the ratio, and may perform coordinate conversions based on the second position data, and first position data of the intersection line measured by the laser sensor.

The controller may calculate a conversion matrix with respect to the image information and the distance information based on the first and second position data, and may perform the coordinate conversions based on the conversion matrix.

To achieve these and other advantages and in accordance with the purpose of the present disclosure, as embodied and broadly described herein, there is also provided a calibration system including a camera configured to capture image information, a laser sensor configured to detect distance information, a calibration device having a plane member disposed within a capturing range by the camera and within a detection range by the laser sensor, respectively, and configured to perform coordinate conversions with respect to the image information and the distance information based on an intersection line between a scanning surface of the laser sensor and the plane member, and a driving device coupled to the plane member to change a posture of the plane member in at least one direction among roll, pitch and yaw directions.

The calibration system may further include a posture detector and a posture controller. The posture detector may be configured to detect a posture of the plane member. The posture controller may be connected to the posture detector or the driving device, and may control the driving device such that one side of the plane member is parallel to the scanning surface of the laser sensor.

The calibration system may include a supporting portion. The supporting portion may be configured to support the driving device, and may have a length variable so as to control a height of the plane member.

To achieve these and other advantages and in accordance with the purpose of the present disclosure, as embodied and broadly described herein, there is still also provided a calibration method for performing coordinate conversions with respect to a camera configured to capture image information, and a laser sensor configured to detect distance information, the calibration method including detecting an intersection line between a plane member disposed within a detection range by the laser sensor and a scanning surface of the laser sensor, calculating position data of an intersection line image captured by the camera, based on one preset side of the plane member, the intersection line, and a plane member image captured by the camera, and calculating a conversion matrix which represents a position relation between the camera and the laser sensor, based on position data of the intersection line image, and position data of the intersection line measured by the laser sensor.

In the calculation step, positions of laser points on the plane member image may be calculated based on a ratio between one side of the plane member and the intersection line, and based on one side image corresponding to one side of the plane member and captured by the camera. The positions of the laser points may be positions of pixels of the intersection line image, the pixels corresponding to two end points of the intersection line.

The calibration method may further include determining whether the number of the laser points corresponds to a reference value for calculating the conversion matrix, and changing a posture of the plane member when the number of the laser points is less than the reference value. The posture of the plane member may be changed in a condition that one side of the plane member is parallel to the scanning surface.

Advantageous Effects of Invention

In the calibration device, the calibration system and the calibration method according to the present disclosure, a conversion matrix which represents a position relation between the camera and the laser sensor may be calculated by using the plane member, the intersection line by the laser sensor, and the plane member image by the camera.

More concretely, the conversion matrix may include intrinsic and extrinsic parameters of the camera, and a coordinate conversion matrix with respect to the camera and the laser sensor, thereby directly changing coordinates with respect to the image information and the distance information.

Furthermore, in the calibration system according to the present disclosure, a position relation between the camera and the laser sensor may be variable by the driving device. This may allow laser points on the plane member and pixels on the plane member image to be detected, with the number more than a reference value. This may result in a precise calculation of a conversion matrix.

BEST MODE FOR CARRYING OUT THE INVENTION

Reference will now be made in detail to the preferred embodiments of the present disclosure, examples of which are illustrated in the accompanying drawings.

Hereinafter, a calibration device by a camera and a laser sensor, a calibration system and a calibration method according to the present disclosure will be explained in more details with reference to the attached drawings. For the sake of brief description with reference to the drawings, the same or equivalent components will be provided with the same reference numbers, and description thereof will not be repeated. A singular expression includes a plural concept unless there is a contextually distinctive difference therebetween.

Figure 1:
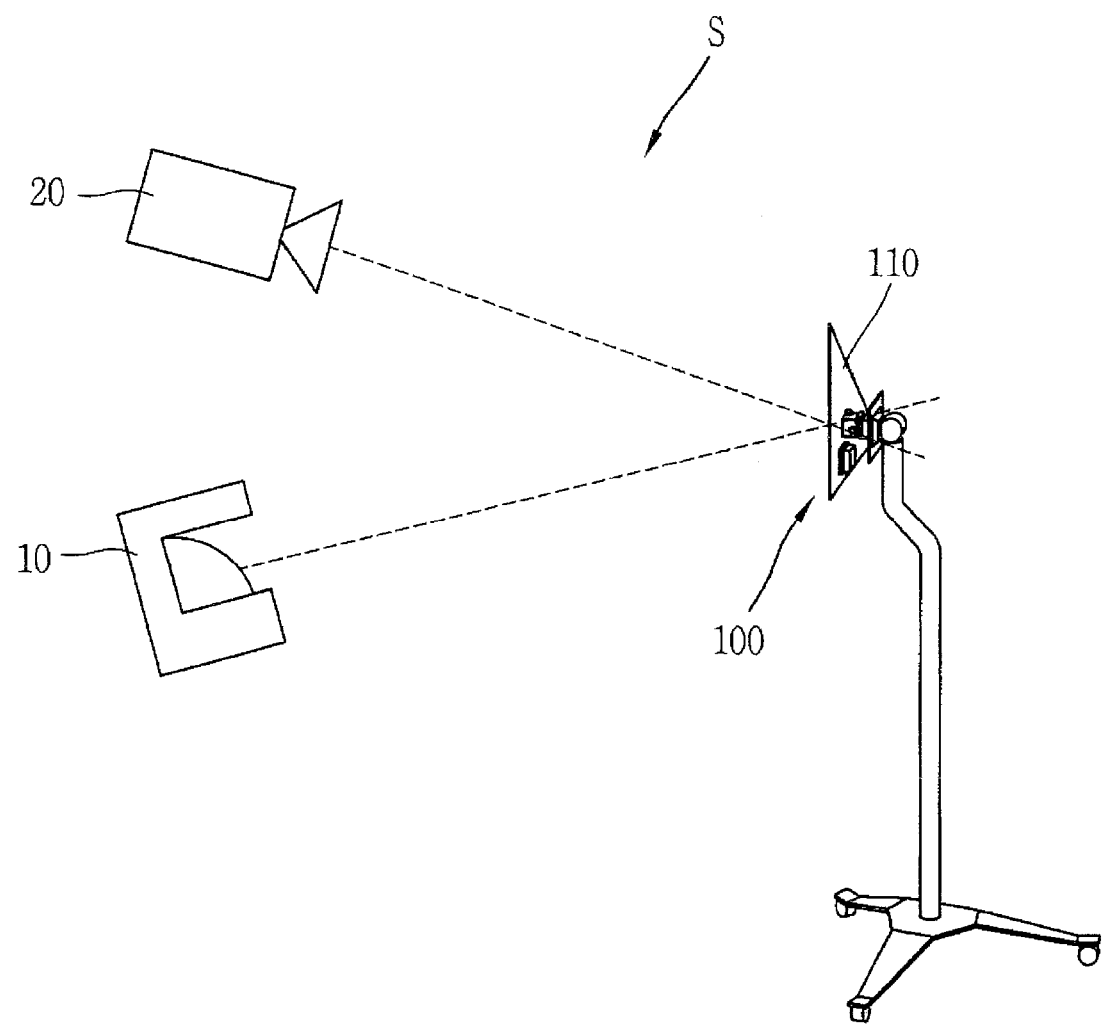
FIG. 1 is a conceptual view of a calibration system according to the present disclosure.

FIG. 1 is a conceptual view of a calibration system according to the present disclosure.

A calibration system (S) includes a laser sensor 10 (or laser distance sensor), a camera 20 and a calibration device 100.

The laser sensor 10 may be implemented as a 2D laser scanner configured to detect distance information of objects to be detected, and configured to receive laser reflected from the object by irradiating laser beam toward the front side. However, the present disclosure is not limited to this. That is, the laser sensor 10 may be implemented as a Frequency Modulated Continuous Wave (FMCW) radar or a 3D laser scanner for obtaining distance information on an object farther than a 2D laser scanner, etc.

The camera 20 for capturing image information may be implemented as a Charge Coupled-Device (CCD) camera, a stereo camera in which a plurality of cameras are fixed to one mount, etc.

The calibration device 100 is provided with a plane member 110 disposed within a capturing range by the camera 20 and within a detection range (measurement range) by the laser sensor 10. For instance, the plane member 110 may be formed to have a shape in which an angle between a bottom side and each hypotenuse side contacting the bottom side is an acute angle.

The calibration device 100 converts coordinates with respect to image information and distance information, based on an intersection line 112 (refer to FIG. 3) between a scanning surface 11 of the laser sensor 10 and the plane member 110. Here, the scanning surface 11 of the laser sensor 10 may indicate a surface perpendicular to a sensing direction of the laser sensor 10.

The calibration device 100 converts coordinates with respect to image information and distance information based on a ratio between one side of the plane member 110 and the intersection line 112, and a plane member image 120 (refer to FIG. 4) included in the image information.

For instance, the one side of the plane member 110 may be a bottom side. Accordingly, the intersection line 112 may be generated as the scanning surface 11 intersects the hypotenuse sides. More concretely, the calibration device 100 calculates position data on the plane member image 120 based on a ratio between the bottom side of the plane member 110 and the intersection line 112, thereby directly converting coordinates with respect to image information and distance information.

Hereinafter, a calibration method applicable to the calibration system (S) will be explained in more details.

Figure 2:
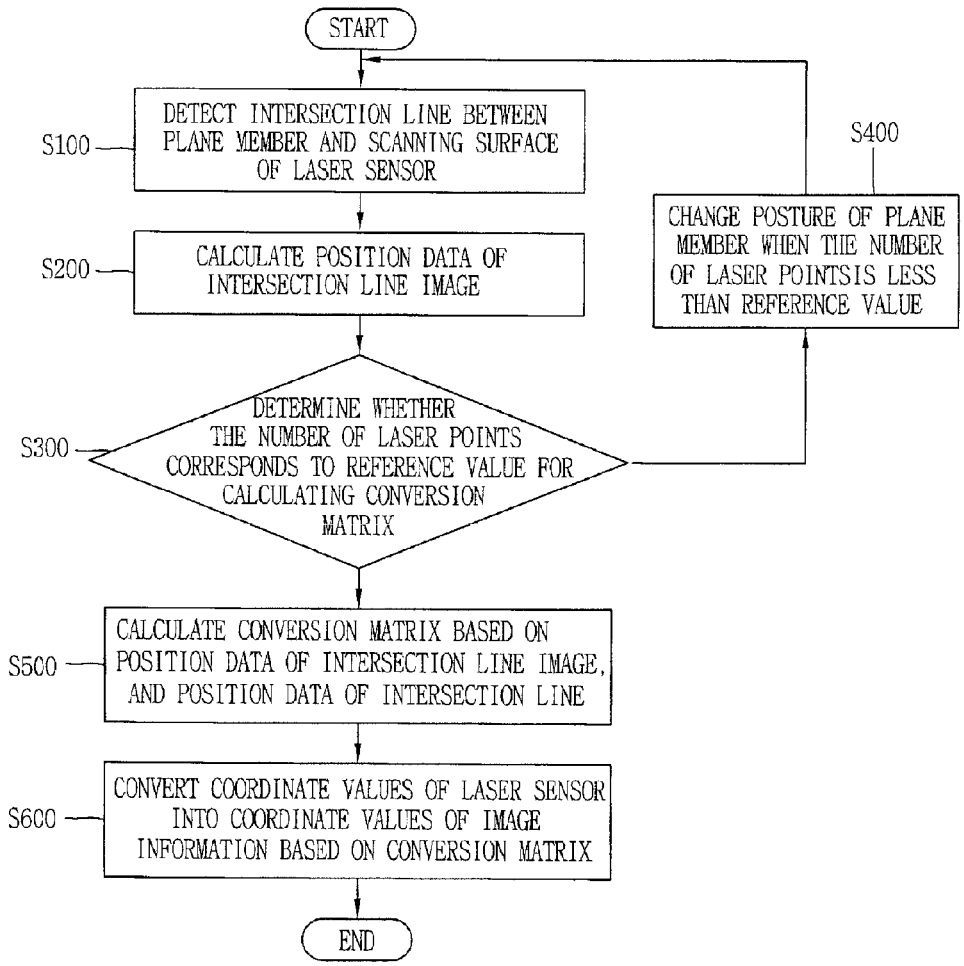
FIG. 2 is a flowchart showing a calibration method according to the present disclosure.

FIG. 2 is a flowchart showing a calibration method according to the present disclosure.

Referring to FIG. 2, firstly, detected is an intersection line between a plane member disposed within a detection range by a laser sensor, and a scanning surface of the laser sensor (S100).

For detection of the intersection line, the plane member is arranged so that one side thereof can be parallel to the scanning surface within a detection range by the laser sensor. For instance, the one side parallel to the scanning surface may be a bottom side of the plane member.

The plane member is formed so that the intersection line can have a length contracted by a predetermined ratio with respect to the bottom side of the plane member. For instance, the plane member may be formed in a triangle shape or a trapezoid shape.

Next, position data of an intersection line image captured by the camera is calculated, based on one preset side of the plane member, the intersection line, and a plane member image captured by the camera (S200).

More concretely, in the calculation step (S200), positions of laser points on the plane member image may be calculated based on a ratio between one side of the plane member and the intersection line, and based on a bottom side image corresponding to the bottom side of the plane member and captured by the camera. The laser points indicate scanning points of laser beam scanned to the plane member (or intersection line).

For instance, a ratio between a preset length of a bottom side and a length of an intersection line is calculated. Then, positions of laser points on the plane member image are calculated based on a relation between the ratio and a length of a bottom side of a plane member image.

Next, it is determined whether the number of the laser points corresponds to a reference value for calculating a conversion matrix (S300).

The conversion matrix indicates a matrix for converting coordinate values of the laser sensor into coordinate values of image information captured by the camera. For instance, when a conversion matrix is a 3×4 matrix, the number of laser points has to be more than 12 for calculation.

Next, when the number of laser points is less than the reference value, a posture of the plane member is changed (S400). The posture of the plane member is changed in a condition that one side of the plane member is parallel to the scanning surface. Also, the posture of the plane member is changed within a capturing range by the camera and a detection range by the laser sensor.

Once the posture of the plane member has been changed, the current process undergoes the detection step (S100), the calculation step (S200) and the determination step (S300) again. When the number of the laser points satisfies the reference value, a conversion matrix is calculated (S500).

In the calculation step (S500), a conversion matrix which represents a position relation between the camera and the laser sensor is calculated based on position data of the intersection line image, and position data of the intersection line measured by the laser sensor.

Accordingly, the laser points may be directly converted into coordinate values on an image captured by the camera, without converting the laser points based on the laser sensor into those based on laser points based on the camera (S600).

Figure 10:
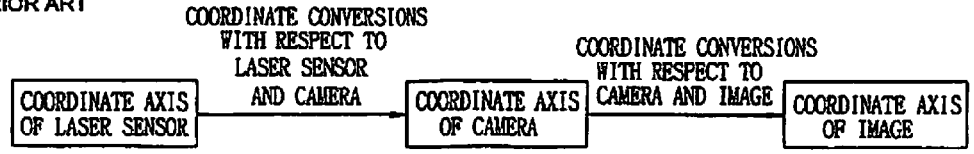
FIG. 10 is a view showing a calibration method by a camera and a laser sensor in accordance with the conventional art.

More concretely, in the conventional calibration method (refer to FIG. 10), a coordinate axis of the laser sensor is converted into a coordinate axis of the camera by using position conversions with respect to the camera and the laser sensor. Then, position conversions with respect to the camera and the image are performed. In the present disclosure, a conversion matrix for converting a coordinate axis of the laser sensor into a coordinate axis of an image is calculated by using geometric restriction conditions for positioning the scanning surface of the laser sensor in parallel to the bottom side of the plane member. This may solve the conventional problems that a calculation time and a complicated degree are increased in a calibration method.

Hereinafter, the calibration method of the present disclosure will be explained in more details with reference to FIGS. 3 to 7.

Figure 3:
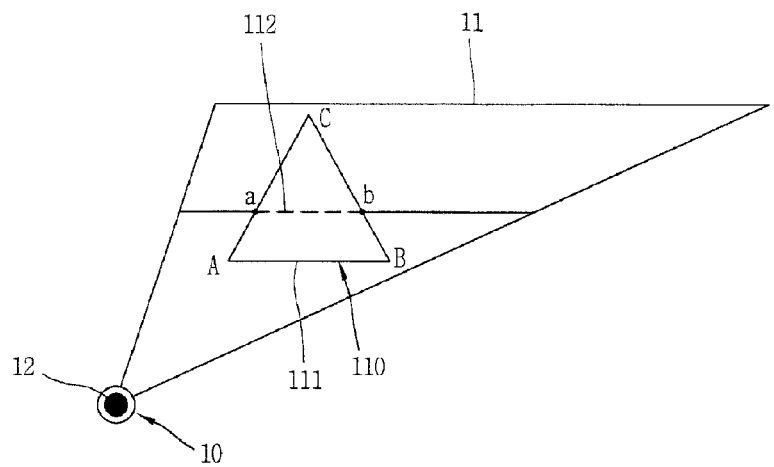
FIG. 3 is a view showing a geometric relation between a plane member and a laser sensor.
Figure 4:
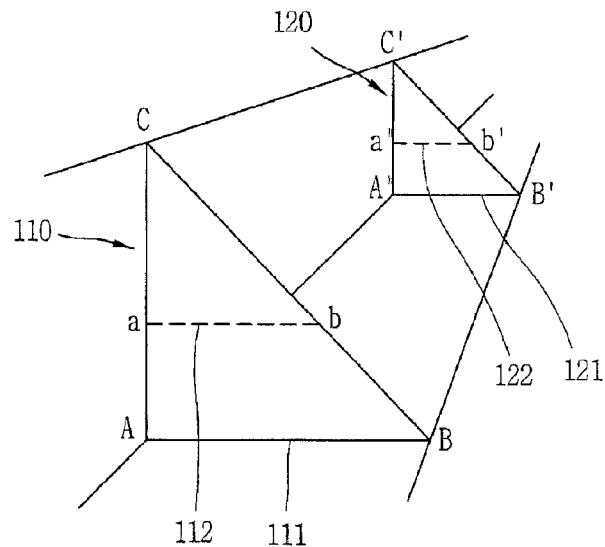
FIG. 4 is a view showing a relation between a plane member and a plane member image.
Figure 5:
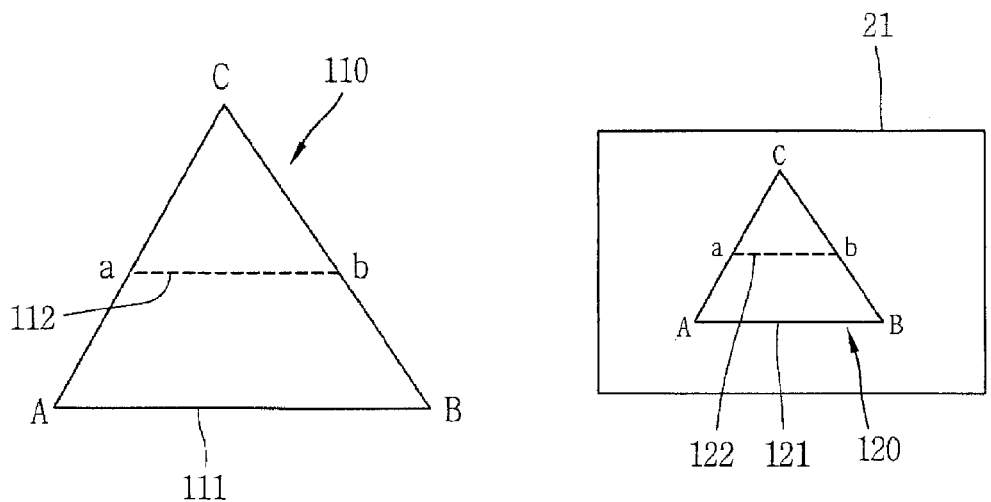
FIG. 5 is a conceptual view showing an example of a calibration using a triangle plane member.
Figure 6:
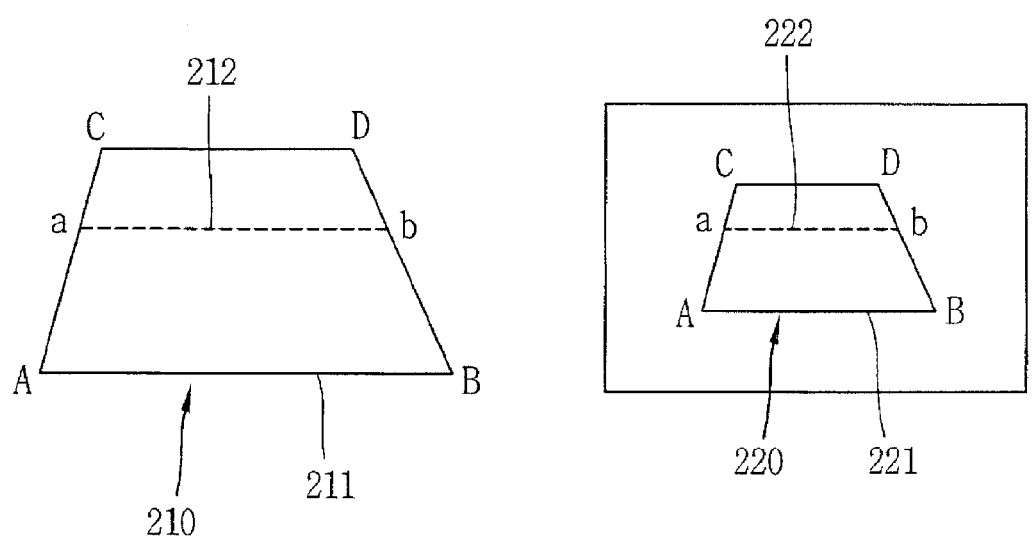
FIG. 6 is a conceptual view showing an example of a calibration using a trapezoid plane member.
Figure 7:
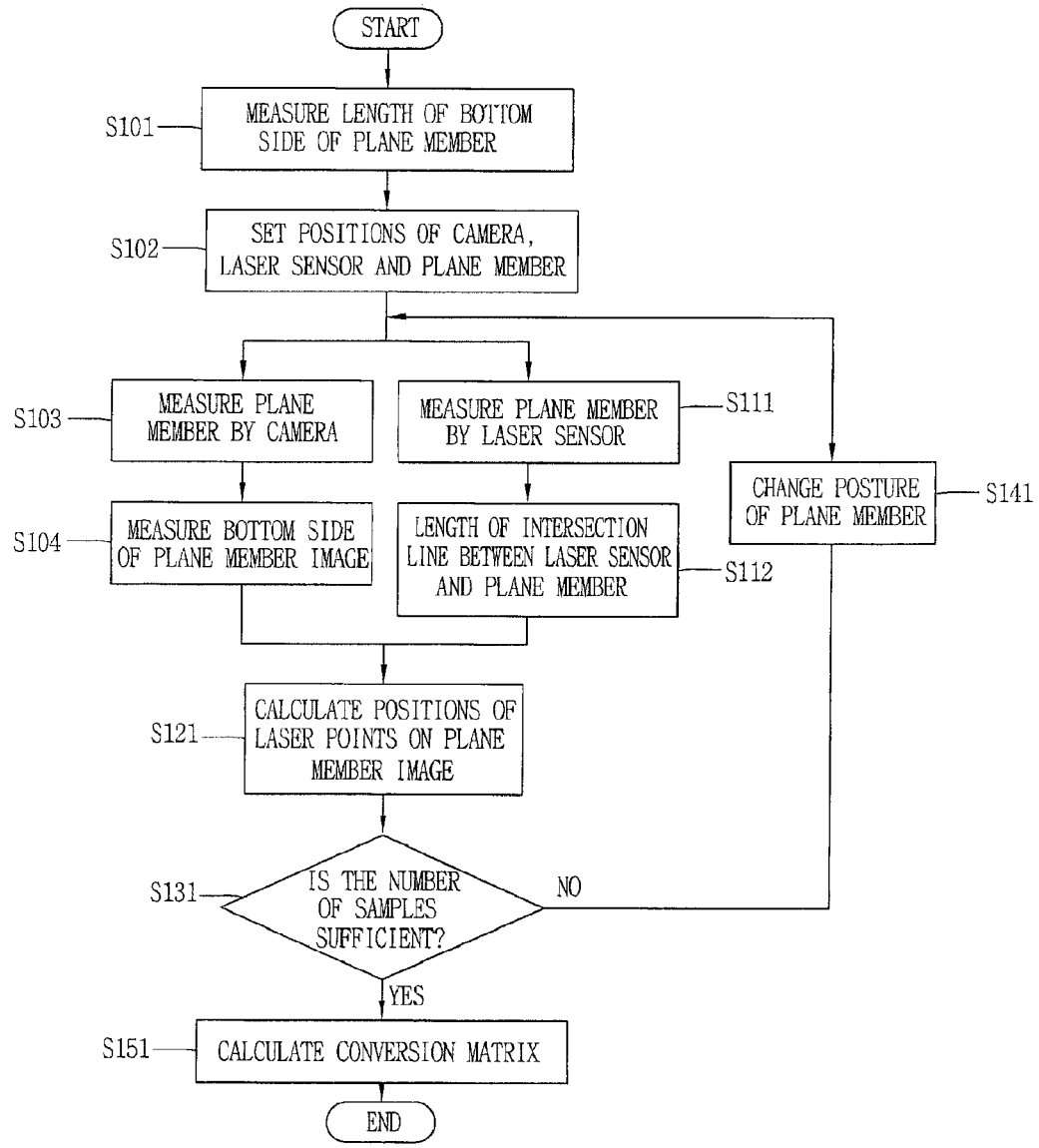
FIG. 7 is a detailed flowchart of the calibration method of FIG. 2.

FIG. 3 is a view showing a geometric relation between a plane member and a laser sensor, FIG. 4 is a view showing a relation between a plane member and a plane member image, FIG. 5 is a conceptual view showing an example of a calibration using a triangle plane member, FIG. 6 is a conceptual view showing an example of a calibration using a trapezoid plane member, and FIG. 7 is a detailed flowchart of the calibration method of FIG. 2.

FIG. 3 shows geometric conditions obtained by positioning the scanning surface of the laser sensor in parallel to the bottom side of the plane member.

The scanning surface 11 of the laser sensor 10, scanned from a center 12 of the laser sensor 10 is configured to intersect the plane member 110 of a triangular shape having a bottom side 111 parallel to the scanning surface 11. Through this intersection, an intersection line 112 (ab) is generated.

Since the scanning surface 11 and the bottom side 111 are parallel to each other, the intersection line 112 (ab) is parallel to the bottom side 111 (AB) of the plane member 110. Since the plane member 110 is disposed within a detection range (measurement range) by the laser sensor 10, each of two hypotenuse sides AC and BC of the plane member 110 has an intersection point with the scanning surface 11. A line formed by connecting the two intersection points to each other serves as the intersection line 112.

FIG. 4 shows a method for estimating points of invisible laser points on an image by using geometric conditions. Once the plane member 110 is measured by the camera 20 (refer to FIG. 1), the plane member 110 is converted into the plane member image 120 on an image. During this process, the plane member image 120 is contracted or expanded by a predetermined ratio with respect to the plane member 110.

Under these conditions, a ratio between the bottom side (AB) of the plane member 110 and the intersection line (ab) is compared with a ratio between a bottom side image 121 (A'B') of the plane member image 120 and an intersection line image 122 (a'b'). Then, calculated is a position of an intersection line (a'b') between the scanning surface of the laser sensor and the plane member on the plane member image 120.

Through the position of the intersection line (ab) and the position of the intersection line image (a'b'), a position relation between the two lines, i.e., a position relation between a laser distance sensor and a camera image is calculated. In this case, a length of the line parallel to the bottom side is variable according to a position by characteristics of a triangle and a trapezoid.

FIG. 5 shows a calibration method using a triangle. The plane member 110 having a triangle shape is measured as the plane member image 120 within a camera image 21. A calibration of a camera and a laser sensor may be implemented by using the intersection line 112, the bottom side 111 of the plane member 110, the intersection line image 122 and the bottom side image 121.

FIG. 6 shows a calibration method using a trapezoid. A calibration may be implemented by using a bottom side 211 of the plane member 210 having a trapezoid shape, an intersection line 212, an intersection line image 222 and a bottom side image 221.

FIG. 7 is a flowchart showing processes of performing a calibration of a camera and a laser sensor according to the present disclosure, which will be explained in more details as follows.

Step 1 (S101): Measure a length of a bottom side of a plane member having a triangle shape or a trapezoid shape.

Step 2 (S102): Locate a camera, a laser sensor and a plane member so that the plane member can be disposed within a capturing range by the camera and a detection range by the laser sensor, and so that the bottom side of the plane member can be parallel to a scanning surface of the laser sensor.

Step 3-1-1 (S103): Measure the plane member by the camera.

Step 3-1-2 (S104): Measure a length of the bottom side of the plane member measured by the camera into a pixel unit.

Step 3-2-1 (S111): Measure the plane member by the laser sensor.

Step 3-2-2 (S112): Measure a length of an intersection line between the scanning surface of the laser sensor and the plane member.

Step 4 (S121): Calculate positions of laser points on a plane member image measured by the camera, based on the measured lengths of the bottom side of the plane member and the intersection line.

Step 5 (S131): Determine whether the number of samples (laser points) is enough to calculate a conversion matrix which represents a position relation between the laser sensor and an image, and whether the number satisfies a precision degree of the camera and the laser sensor.

Step 6-1 (S141): When the number of the samples is not enough, change a posture of the plane member within the conditions of Step 2 of the plane member, and return to Step 3

Step 6-2 (S151): Calculate a conversion matrix which represents a position relation between the camera and the laser sensor.

Here, the positions of the laser points may be positions of pixels of the intersection line image, the pixels corresponding to two end points of the intersection line.

For instance, when an intrinsic parameter of the camera is '3×3' and an extrinsic parameter of the camera is '3×4', a conversion matrix is '3×4'. Once measurements are performed six times, the positions of the pixels may be detected twelve times so that the conversion matrix of '3×4' can be calculated.

Figure 8:
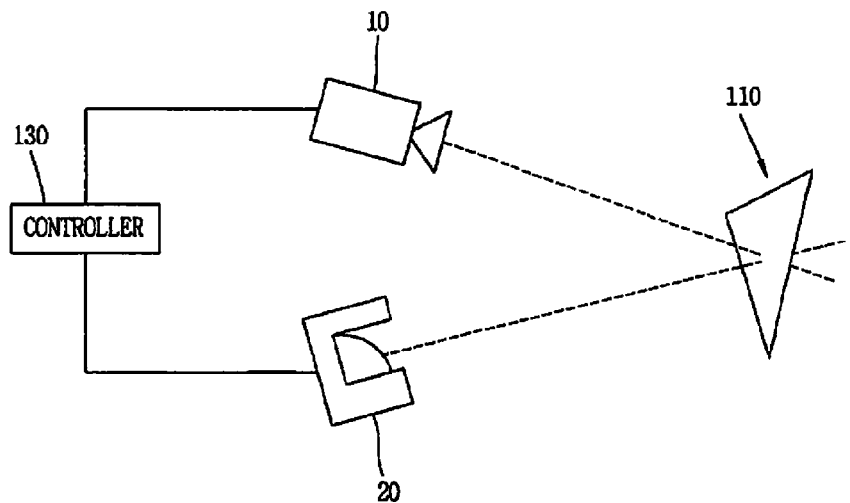
FIG. 8 is an enlargement view of the calibration device of FIG. 1.
Figure 9:
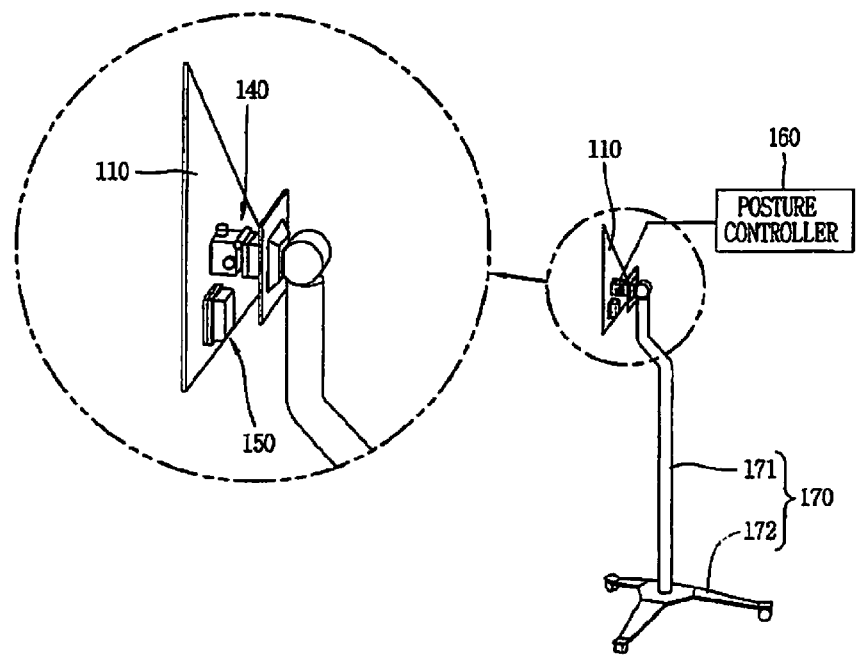
FIG. 9 is a detailed view of a driving device where a plane member of FIG. 1 has been mounted, and a supporting portion.

Hereinafter, a calibration device and a calibration system to which the calibration method is applied will be explained in more details with reference to FIGS. 8 and 9. FIG. 8 is an enlargement view of the calibration device of FIG. 1, and FIG. 9 is a detailed view of a driving device where the plane member of FIG. 1 has been mounted, and a supporting portion.

FIG. 8 is a conceptual view of a calibration device which performs a calibration, in which the plane member 110 is disposed within a capturing range by the camera 20 and a detection (measurement) range by the laser sensor 10. In this case, the plane member 110 having a triangle shape can be a plane member 110 having a trapezoid shape.

Referring to FIG. 8, the plane member 110 and a controller 130 are implemented as a calibration module. The calibration module performs a calibration of the camera 20 and the laser sensor 10 by obtaining a relation between image information of the camera 20 and distance information of the laser sensor 10.

For instance, the plane member 110 is disposed to intersect the scanning surface of the laser sensor 10 so that an intersection line can be generated, and is disposed within a capturing range by the camera 20 so as to be captured by the camera 20.

The controller 130 converts coordinates with respect to the image information and the distance information, based on a ratio between one side of the plane member 110 (e.g., a bottom side of a triangle) and an intersection line, and a plane member image included in image information. For calculation of the ratio, one side of the plane member 110 is disposed to be parallel to the scanning surface.

More concretely, the controller 130 calculates second position data of an intersection line image corresponding to the intersection line, from the plane member image by using the ratio. Here, the second position data may indicate positions of pixels of the intersection line image, the pixels corresponding to two end points of the intersection line.

The controller 130 performs coordinate conversions based on the second position data, and first position data of the intersection line measured by the laser sensor. The first position data may be implemented as laser points scanned to two end points of the intersection line. For coordinate conversions, the controller 130 calculates a conversion matrix with respect to the image information and the distance information based on the first and second position data. That is, the controller 130 performs coordinate conversions by using the conversion matrix.

Referring to FIG. 9, the calibration system (S: refer to FIG. 1) includes at least one of a driving device 140, a posture detector 150 and a posture controller 160.

The driving device 140 is coupled to the plane member 110 to change a posture of the plane member 110 in at least one direction among roll, pitch and yaw directions. For instance, the driving device 140 is mounted at a rear side of the plane member 110 to change a posture of the plane member 110 in roll, pitch and yaw directions.

The posture detector 150 is configured to detect a posture of the plane member 110. The posture controller 160 is connected to the posture detector 150 or the driving device 140, and controls the driving device 140 such that a bottom side of the plane member 110 is parallel to a scanning surface of the laser sensor.

For instance, a plurality of posture detecting sensors mounted at a rear side of the plane member 110 provide information on postures of the plane member 110 in roll, pitch and yaw directions. Based on this posture information, the posture controller 160 controls the plane member 110.

As shown, a supporting portion 170 is formed to support the driving device 140. The supporting portion 170 is configured to have a length variable so as to control a height of the plane member 110.

For instance, the supporting portion 170 includes a fixing shaft 171 and a supporting plate 172.

One end of the fixing shaft 171 is connected to the driving device 140, thereby fixing the plane member 110. Another end of the fixing shaft 171 is connected to the supporting plate 172, and is configured to have a height controllable so as to control a height of the plane member 110. Through these structures, the plane member 110 may be disposed within a capturing range by the camera 20 and a detection range by the laser sensor 10.

It will also be apparent to those skilled in the art that various modifications and variations can be made in the present disclosure without departing from the spirit or scope of the disclosure. Thus, it is intended that the present disclosure cover modifications and variations of this disclosure provided they come within the scope of the appended claims and their equivalents.

INDUSTRIAL APPLICABILITY

The calibration device by the camera and the laser sensor, the calibration system, and the calibration method have industrial applicability.

The invention claimed is:

1. A calibration device, comprising:
a camera configured to capture image information;
a laser sensor configured to detect distance information; and
a calibration module configured to perform a calibration of the camera and the laser sensor by obtaining a relation between the image information and the distance information,
wherein the calibration module comprises:
a plane member disposed to intersect a scanning surface of the laser sensor such that an intersection line is generated, and disposed within a capturing range by the camera so as to be captured by the camera, and a controller configured to perform coordinate conversions with respect to the image information and the distance information based on a ratio between one side of the plane member and the intersection line, and based on a plane member image included in the image information.

2. The calibration device of claim 1, wherein the one side of the plane member is disposed to be parallel to the scanning surface.

3. The calibration device of claim 2, wherein the plane member is formed in a triangle or a trapezoid having the one side as a bottom side.

4. The calibration device of claim 1, wherein the controller calculates second position data of an intersection line image corresponding to the intersection line, from the plane member image by using the ratio, and performs coordinate conversions based on the second position data, and first position data of the intersection line measured by the laser sensor.

5. The calibration device of claim 4, wherein the controller calculates a conversion matrix with respect to the image information and the distance information based on the first and second position data, and performs the coordinate conversions based on the conversion matrix.

6. A calibration system, comprising:
a camera configured to capture image information;
a laser sensor configured to detect distance information;
a calibration device having a plane member disposed within a capturing range by the camera and within a detection range by the laser sensor, and a controller configured to perform coordinate conversions with respect to the image information and the distance information based on an intersection line between a scanning surface of the laser sensor and the plane member; and
a driving device coupled to the plane member to change a posture of the plane member in at least one direction among roll, pitch and yaw directions.

7. The calibration system of claim 6, further comprising:
a posture detector configured to detect a posture of the plane member; and
a posture controller connected to the posture detector or the driving device, and configured to control the driving device such that one side of the plane member is parallel to the scanning surface of the laser sensor.

8. The calibration system of claim 7, wherein the plane member is formed in a triangle or a trapezoid having the one side as a bottom side.

9. The calibration system of claim 6, further comprising a supporting portion configured to support the driving device, and having a length variable so as to control a height of the plane member.

10. The calibration system of claim 6, wherein controller is configured to perform coordinate conversions with respect to the image information and the distance information based on a ratio between one side of the plane member and the intersection line, and based on a plane member image included in the image information.

11. The calibration system of claim 10, wherein the controller calculates second position data of an intersection line image corresponding to the intersection line, from the plane member image by using the ratio, and performs coordinate conversions based on the second position data, and first position data of the intersection line measured by the laser sensor.

12. A calibration method for performing coordinate conversions with respect to a camera configured to capture image information, and a laser sensor configured to detect distance information, the calibration method comprising:
detecting an intersection line between a plane member disposed within a detection range by the laser sensor and a scanning surface of the laser sensor;
calculating position data of an intersection line image captured by the camera, based on one preset side of the plane member, the intersection line, and a plane member image captured by the camera; and
calculating a conversion matrix which represents a position relation between the camera and the laser sensor, based on a position data of the intersection line image, and position data of the intersection line measured by the laser sensor.

13. The method of claim 12, wherein the calculation step, positions of laser points on the plane member image are acquired based on a ratio between one side of the plane member and the intersection line, and based on one side image corresponding to one side of the plane member and captured by the camera.

14. The method of claim 13, wherein the laser points indicate positions of pixels on the intersection line image, the pixels corresponding to two end points of the intersection line.

15. The method of claim 13, further comprising:
determining whether the number of the laser points corresponds to a reference value for calculating the conversion matrix; and
changing a posture of the plane member when the number of the laser points is less than the reference value.

16. The method of claim 15, wherein the posture of the plane member is changed in a condition that one side of the plane member is parallel to the scanning surface.

* * * * *